United States Patent [19]

Levine

[11] 4,197,536
[45] Apr. 8, 1980

[54] AIRPORT SURFACE IDENTIFICATION AND CONTROL SYSTEM

[75] Inventor: Arnold M. Levine, Chatsworth, Calif.

[73] Assignee: International Telephone and Telegraph Corporation, New York, N.Y.

[21] Appl. No.: 955,891

[22] Filed: Oct. 30, 1978

[51] Int. Cl.² .................................................. G01S 9/56
[52] U.S. Cl. .................................. 343/5 LS; 343/6 A; 343/6.5 R
[58] Field of Search .................. 343/5 LS, 6 A, 6.5 R

[56] References Cited
U.S. PATENT DOCUMENTS 4,126,859  11/1978  Böhm ................................ 343/5 LS Primary Examiner—T. H. Tubbesing
Attorney, Agent, or Firm—William T. O'Neil

[57] ABSTRACT

For aircraft equipped with ATCRBS and ILS, an identification and surface guidance system including a plurality of detection positions each including an interrogator and an auxiliary transponder located adjacent the runway and on opposite sides thereof, respectively. The interrogator is enabled through a signal cable from a remote location, such as a control tower, to produce the first of the discretely spaced pulse pair required to interrogate the ATCRBS equipment. The second interrogation pulse of the pair is generated by the transponder, which is activated by the radiated first pulse from the interrogator and includes an internal delay, such that this delay plus the transit time from the transponder serves to generate the second pulse of the pair if the aircraft to be interrogated is in the vicinity and on the pathway centerline or within a specified lateral tolerance therefrom. The ATCRBS reply may be received directly at the control tower or may be transmitted by cable from receiving equipment within the interrogator. ATCRBS decoding and display equipment may be employed at the control tower for discrete identification of a given aircraft. The identification points are distributed along a runway, taxiway or other surface area of an airport for continuing identification. Time discrimination apparatus compares the ATCRBS pulse train received by the transponder and retransmitted therefrom to the interrogator to that received directly by the interrogator to generate a signal representative of the aircraft deviation from pathway centerline, and this signal is transmitted on an unused ILS channel to the aircraft for presentation to the pilot on the localizer cross-pointer indicator within the aircraft.

6 Claims, 4 Drawing Figures

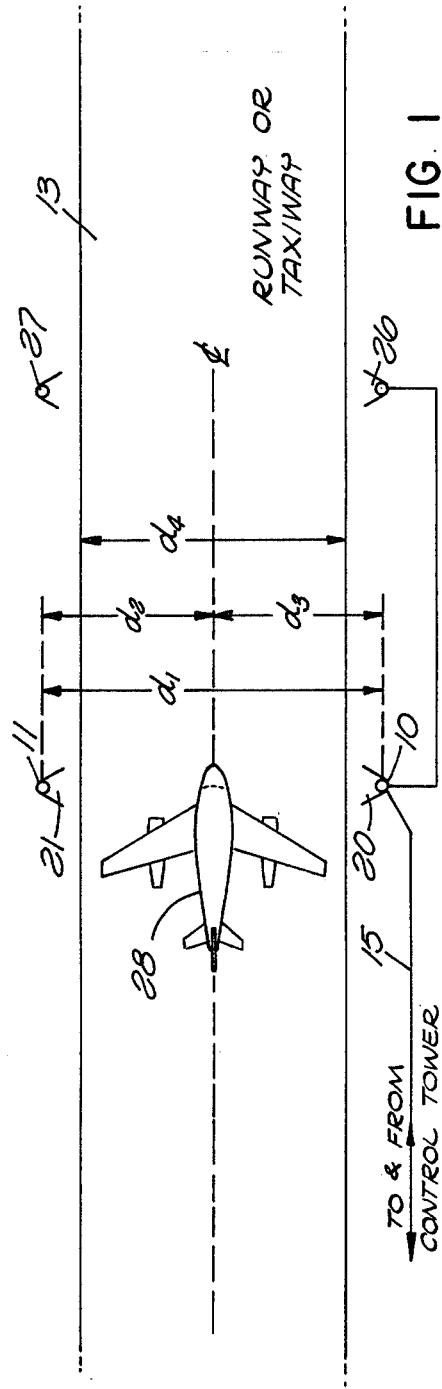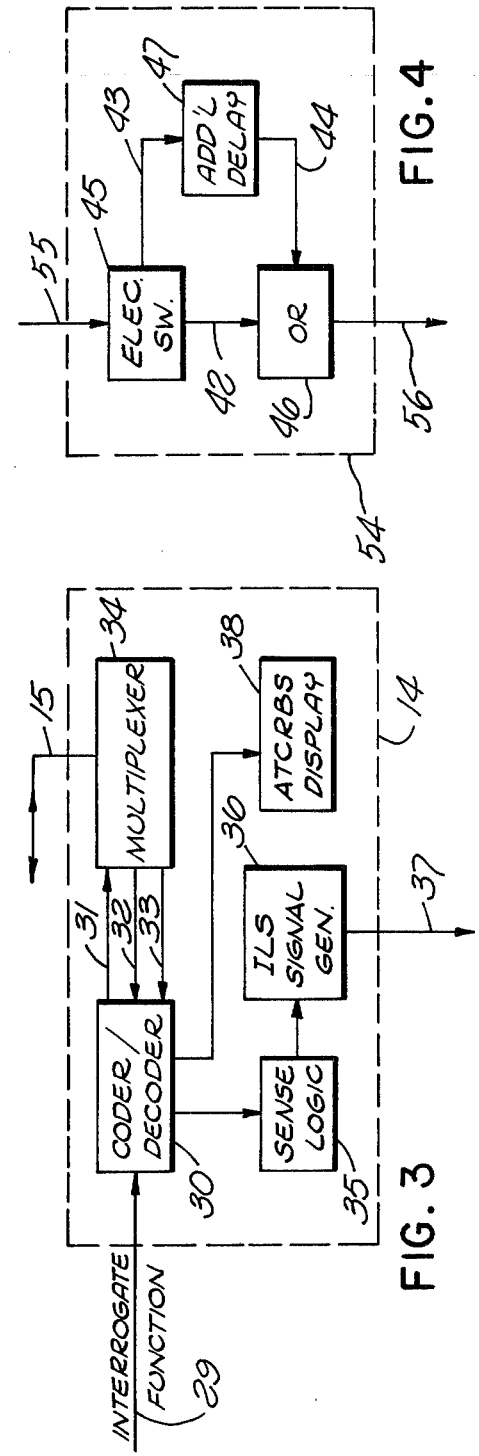

AIRPORT SURFACE IDENTIFICATION AND CONTROL SYSTEM

BACKGROUND OF THE INVENTION

1. Field of the Invention

The invention relates to apparatus for discrete guidance control of aircraft along runways, taxiways and other prescribed pathways on the surface of an airport.

2. Description of the Prior Art

In the prior art much attention has been devoted to enroute navigation by electronic means, for commercial aircraft especially. Approach and landing aids have also received much attention, the best known of these being of the ILS (Instrument Landing System) type providing cross-pointer indication in the cockpit of an aircraft in both the localizer (azimuth), and glideslope (elevation) coordinates. Various radar systems, including the well-known GCA (Ground Controlled Approach) system have also been effectively used to track aircraft approaching for landing so that verbal instructions can be given, by radio, permitting a pilot to correct his landing approach in both azimuth and elevation in essentially zero visibility conditions.

It has been more recently recognized that an additional problem exists once the aircraft has landed, namely, the problem of ground or airport surface surveillance, identification and actual guidance control on the airport surface. Especially in large metropolitan airports, weather conditions as benign as atmospheric haze may restrict visibility to the end of a relatively long runway and the related taxiways and approach ramps, even for an optimally located control tower. Still further, the presence of buildings and other structures about the perimeter of such metropolitan airports produces additional difficulty in obtaining clear visual surveillance of the entire surface of an airport from the control tower. Such surveillance is a necessary first step toward provision of guidance to an aircraft on the airport surface.

One of the well-known approaches to airport surface traffic control has been the use of scanning radars operating at very high frequencies, such as the so-called "K" radar band. This is considered necessary in order to obtain adequate definition and resolution. An existing airport, ground, traffic control equipment of that type is known in the art as ASDE (Airport Surface Detection Equipment). As generally conceived such equipment provides surveillance only, no discrete identification of aircraft on the surface being available. Moreover, surface control from ASDE data is a complex matter, requiring much additional equipment.

Among the other proposed systems for the purpose is a so-called Tower-Automated, Ground Surveillance (TAGS) which uses multilateration to interrogate aircraft transponders.

Still further, the so-called LOCAR (Localized Cable Radar) has been proposed, this system being described as a surveillance system in U.S. Pat. No. 3,872,474, and as a surface control system in U.S. Pat. No. 3,971,025.

High definition surface surveillance equipment, such as the so-called ASDE has other significant disadvantages. Among these is the need for a relatively high antenna tower and a relatively large rotating antenna system thereon. Large reflectors or other expedients are employed to obtain sufficiently narrow beams for the purpose. Shadowing due to structures, undesired reflections and unacceptably high absorption of the transmitted radar energy in the presence of hydrometeoric phenomena occurs due to the extremely high radar frequencies employed.

Still further, no practical surface guidance scheme compatible with ASDE appears to be available. Such an addition to ASDE would appear to require complex additional apparatus, and possibly additional "on-board" equipment.

The so-called TAGS system, while it does provide identification, depends on a complex, centralized, mulilateration technique requiring expensive and complicated timing, blanking and processing equipment. Additionally, surveillance is usually not provided over the entire airport surface because central locations providing unshadowed line-of-sight over the entire airport surface of interest are not generally available.

The LOCAR system described in the aforementioned U.S. Pat. Nos. 3,872,474 and 3,971,025 is a system with which the present invention is compatible structurally and functionally, since it is basically a "cabled" arrangement. The LOCAR as described in U.S. Pat. No. 3,872,474 provides no discrete aircraft identification per se but can be augmented to do so by the addition of the apparatus hereinafter described.

A similar invention providing the required surveillance and identification is described in copending U.S. Pat. application A. Levine 47-4, filed Oct. 2, 1978, Ser. No. 947,729 the present invention being an extension and further development thereof.

The manner in which the invention deals with the disadvantages of the prior art to provide a unique, low-cost, highly effective, airport surface surveillance and identification system will be evident as this description proceeds.

SUMMARY

In consideration of the prior art disadvantages as aforementioned, it may be said to have been the general object of the invention to further amplify a previously described system for airport surface surveillance and identification to include surface guidance not requiring additional "on-board" equipment and which is inexpensive, easy to install and simple to operate.

The combination of the invention involves a series of spaced combined interrogation and guidance error detection locations along a runway, taxiway or other portion of an aircraft surface. Each such location involves an interrogator extending minimally above the aircraft surface on one side of the pathway and a similarly low profile transponder on the opposite side. The interrogator includes receiving equipment, a signal cable or cables connecting the interrogator location (or locations) to a remote location such as a control tower. For identification, the ATCRBS reply which is solicited by the apparatus of the invention may be received by direct radiation at the remote location, or may be multiplexed back on the interrogation cable along with the guidance error signals.

The on-board ATCRBS equipment in general use is designed to radiate an identifying code, normally when the aircraft is airborne, in response to a pulse pair transmitted to it by a ground station. The invention makes use of this so-called Mode II operation of the ATCRBS equipment which requires that the interrogating pulse pair consists of two pulses spaced 8 microseconds (plus or minus a nominal tolerance). The so-called ATCRBS equipment and its operation are described in Chapter 16 of the text "Avionics Navigation System" by Myron Kayton and Walter R. Fried, a John Wiley and Sons publication (1969). The text is further identified as Library of Congress Catalog No. 69-13679. That reference is especially useful to the reader not fully familiar with the standard ATCRBS equipment.

According to the invention, the pulse pair required to trigger the ATCRBS is generated discretely at each location by virtue of the fact that it is uniquely generated from two points, one on each side of the runway. Each interrogator location is discretely addressed, preferably digitally, from the remote locations to cause it to generate the first pulse of the pulse pair. That first pulse not only is "heard" by the ATCRBS on the aircraft to be interrogated, but is also received by the transponder on the opposite side of the runway. An appropriate delay in the transponder together with the delays due to physical spacing insures that the proper interrogation spacing is provided as the second pulse of the interrogation code is generated by the transponder. The basic reason for this arrangement according to the invention is to prevent ATCRBS equipment of other aircraft at other locations on the airport from being interrogated as they would be if both pulses of the pair were initiated from the same point.

The interconnecting signal cable may be a standard electrical coaxial cable, however, fiber optic cables with suitable transducers of known type at both ends can be employed. The discrete addressing of each interrogator on the airport surface is logically accomplished by an operator in accordance with a map of the airport surface where the interrogation points are numbered or otherwise identified at the control tower.

Whether or not the ATCRBS replies are received directly by radiation or through receiving equipment in the interrogator at a given point along the pathway and then by cable to the control tower, existing ATCRBS decoding and display equipment meant for use in the standard operation of the ATCRBS, in connection with aircraft which are enroute or are making landing approaches, can provide the identification of a corresponding aircraft on the ground in a form usable to control tower operating personnel.

The transponder at each location, in addition to operating to form the second pulse of the pulse pair, also retransmits the ATCRBS reply code pulse group. The interrogator includes means for computing the time delay between ATCRBS reply code direct reception at the interrogator and delayed reception through the transponder, the time difference being a measure of the aircraft deviation from pathway centerline. That error signal is retransmitted, such as by multiplexing on the interrogation cable, to the ILS localizer transmiter, where an unused ILS channel is used to transmit it to the aircraft to effect guidance in accordance with ILS localizer cross pointer indication in the cockpit.

The details of a typical embodiment with variations will be understood from the description hereinafter.

BRIEF DESCRIPTION OF THE DRAWINGS

FIG. 1 is a semi-pictorial, plan view illustrating physical relationships among the aircraft, the interrogator and the transponder according to the invention.

FIG. 3 is a schematic block diagram of components within the control tower shown in FIG. 2.

FIG. 4 is a schematic block diagram of the delay switching function in the transponder of FIG. 2.

DETAILED DESCRIPTION

Figure 2:
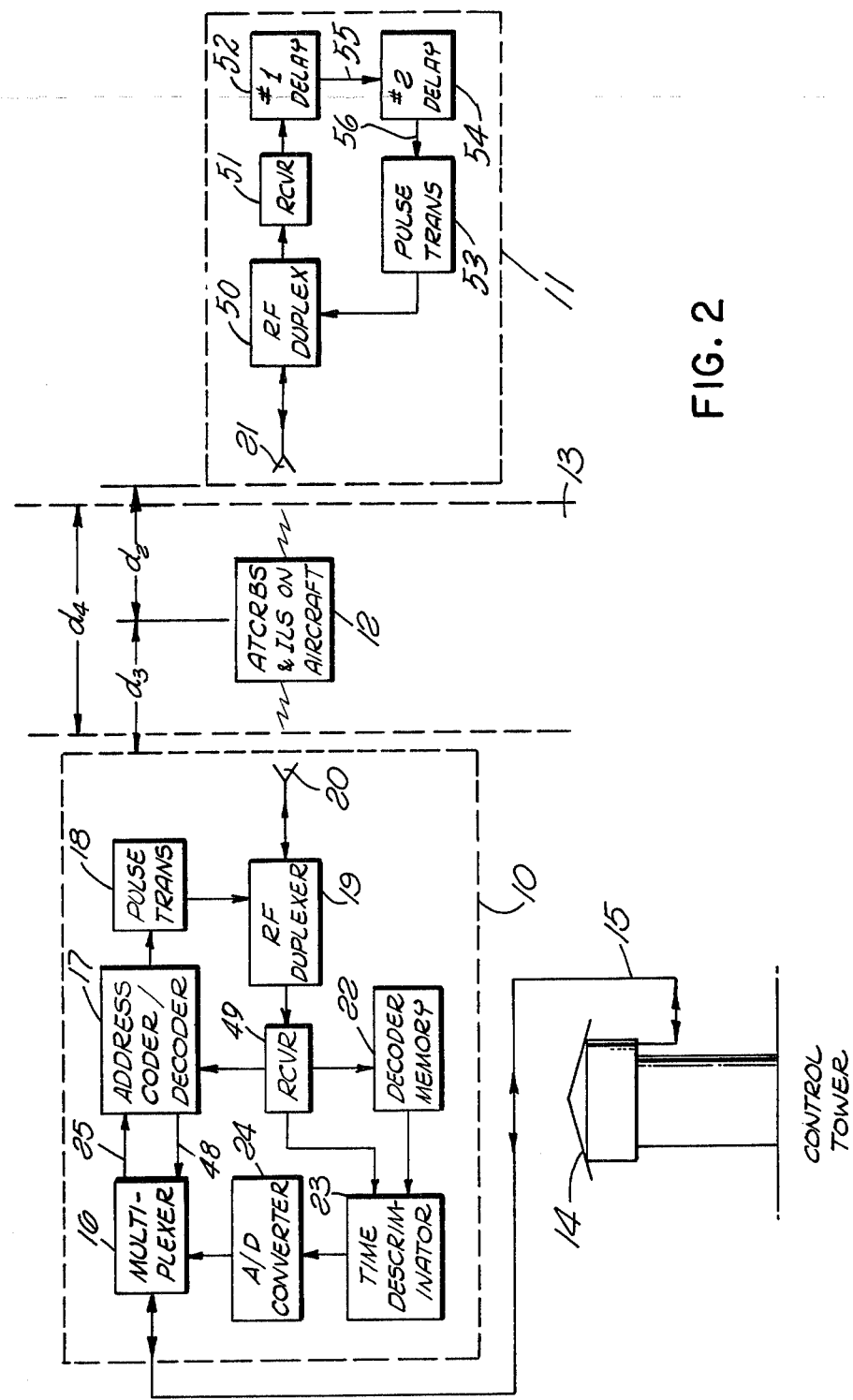
FIG. 2 is a schematic block diagram illustrating the elements of the system according to the invention.

Referring now to FIG. 1, an interrogator 10 with antenna 20 and the corresponding transponder 11 with antenna 21 are illustrated on opposite sides of the runway, taxiway or other pathway 13. Two additional interrogator/transponder combinations comprising 26 and 27 respectively, are illustrated, however, it is to be understood that many more such interrogation points would normally be required. A cable 15 from the remote location (control tower normally) is connected to all interrogators in the system, interrogators 10 and 26 being representative ones of these interrogators. An aircraft 28 proceeding down the pathway 13 passes directly between 10 and 11 and is subject to having its ATCRBS equipment interrogated, as will be more fully understood, in lateral spacing between 10 and 11 which is depicted as $d_1$, it being understood that this spacing would also apply to 26 and 27 and all other such interrogator/transponder combinations in the system. The distances $d_2$ and $d_3$ would normally each be one-half of $d_1$, although where local conditions might produce some small variation therefrom, it would usually still be possible to have a small difference between $d_2$ and $d_3$ as long as the result is not large enough to cause the spacing between the pulses of the pulse pair for interrogating the ATCRBS on aircraft 28 to thereby be out of tolerance. This will be more fully understood as this description proceeds.

Referring now to FIG. 2, pathway 13, which may be a runway, taxiway or the like is shown having the same width $d_4$ as illustrated on FIG. 1. The ATCRBS equipment 12 is to be understood to be on-board the aircraft 28.

Assume that an operator in the control tower 14 initiates an interrogator by sending a discretely coded (discrete address) signal down the cable 15. This description will assume that the interrogator enabling signal thus supplied as an electrical signal is in the video domain. It is highly desirable that this discretely coded interrogation-enable signal be digital in form, since the techniques for discretely addressing a desired one out of a plurality of interrogators connected essentially in parallel from cable 15 are well developed and readily available in the digital computer art. The inherent advantages of digital signals over a transmission medium are well understood.

If it is assumed that the code supplied from 14 to 10 via cable 15 at any given time is the correct address code for 10, it will pass through muliplexer 16 and into the address coder/decoder 17 via lead 25 for recognition within block 17. The correct address might be also contained in a simple read-only memory in 17, from which a comparison is made to confirm the correctness of the address. Once this has been confirmed, block 17 sends an enabling signal or a trigger pulse to pulse transmitter 18 which then transmits the first of the ATCRBS inquiry pulse pair pulses through RF duplexer 19 and toward the aircraft 28 and the ATCRBS itself (identified at 12) via antenna 20. This first pulse also passes on and enters antenna 21 where it passes through RF duplexer 50 in the transponder unit 11 and is detected in receiver 51. The #1 delay 52 is preselected such that pulse transmitter 53 is activated to produce the second pulse of the aforementioned pulse pair, which is transmitted back through RF duplexer 50 and out through antenna 21 to 12 so as to arrive, taking into consideration actual space delays encountered, delayed from the first pulse by a value within the allowable tolerance for activating the on-board ATCRBS unit 12.

For the time being, the #2 delay 39 will be assumed to be zero, its complete function being hereinafter explained more fully in connection with FIG. 4.

The transmitting power and receiving sensitivity of units 10 and 11 are both relatively low in view of their close spacing and their proximity to 12 in operation. The output of unit 12 on the other hand, is much greater in terms of peak pulse power, that unit being designed to cover substantial distances when the aircraft is enroute. Accordingly, AGC operative within receivers 49 and 51 will operate to greatly reduce sensitivity during the time of reception of the ATCRBS reply.

As has been previously indicated, the ATCRBS reply code might be directly received at control tower 14 by radiation as it would have been in the case of an airborne interrogation situation. In view of the relatively low powers of 10 and 11, and more importantly, due to the fact that the delay and double point pulse pair generation scheme just described, the existence of a pulse pair correctly spaced to cause an activation elsewhere on the airport or on any airborne ATCRBS nearby is substantially precluded, the intended interrogation will therefore be understood to be entirely discrete.

The multiplexer 16 could be one of several types, such as a time-sharing multiplexer, a frequency separation device or a polarity separation device. If a fiber optic cable and transmission system as employed, the very great bandwidth thereby available increases the multiplexing options available. Light signal color separation can be used in such systems.

The ATCRBS reply as detected in receiver 49 is again discretely addressed in 17 before it is fed back through cable 15 via multiplexer 16.

At this point it is well to realize that certain variations are possible. For example, it may be noted that, since the activation of interrogator 10 results from a discrete enabling code supplied from control tower 14 via cable 15, and since the ATCRBS reply is available for retransmission essentially simultaneously when compared to the speed with which a subsequent manually originated inquiry can be effected in 14, it may be assumed that any reply observed at the remote location is from the aircraft just interrogated at the corresponding location on the airport surface. However, where a number of aircraft might be of concern on various areas of the airport at any one time, discrete addressing of the reply, as contemplated in FIG. 2, is obviously desirable.

Still further, the skilled practitioner in this art will realize that each interrogator such as 10 or 26 might contain a short term memory into which it can record ATCRBS replies continuously. Along with this, the interrogators might be operated in a predetermined sequence at all times to keep these interrogator memories loaded with updated information as a given aircraft passes its location. Discrete addressing from the tower 14 could then obtain this up-to-date information for any selected interrogation location.

Referring now to FIG. 3, a schematic block diagram of the typical components which would be required in the control tower 14 is presented. In response to an interrogation, presumably manual or programmed, a discrete address coder/decoder 30 activitates a selected interrogator by an enabling signal on lead 31 through multiplexer 34 and cable 15, and into the circuitry of 10 as previously described. The ATCRBS reply returning via cable 15 passes through multiplexer 34 and is directed back into 30, which decodes the discrete address associated therewith which was applied in block 17 of any of the various interrogators of the system. An existing type ATCRBS display 38 can present the ATCRBS replies conveyed from 30 and converted as necessary into a familiar form. The display 38 may be basically the same equipment employed in the known ATCRBS systems, the display being operated simultaneously or alternatively for air-derived and ground-derived replies.

According to the foregoing, the operation of the arrangement of FIG. 2 for the purpose of obtaining discrete identification on a pathway of the airport surface will be understood. Essentially, the discrete ATCRBS reply code identifies the aircraft as it would in the intended airborne operation of the ATCRBS equipment. For the known airborne interrogation arrangement, however, the required spaced pulse pair is generated and radiated from a central location such as a control tower. The unique arrangement contemplated according to the invention on the other hand, for generation of the spaced pulse pair in the airport surface situation is important for the avoidance of spurious replies.

In the hereinabove description, the operation of the number 2 delay block 39 in FIG. 2 was ignored, since it has no function in the interrogation/identification mode. Referring also to FIG. 4, the elements of the circuit and system are shown for deriving an air signal representative of the lateral deviation of an aircraft from the centerline to the invention.

From FIG. 2, it will be realized that the first pulse of the pulse pair as it is generated in interrogator 10 and radiated from antenna 20 is not only "seen" by the ATCRBS equipment 12 on the aircraft but also passes on and, a fraction of a microsecond later, enters the antenna 21 of the transponder equipment 11 on the opposite side of the runway. According to the previous description, this pulse is delayed, after being received in first delay 52, by an amount sufficient, when added to the spatial delays, to provide the properly spaced second pulse of the pair.

FIG. 4 shows that the second delay block 54 receives the output of 52 on lead 55. Electronic switch 45 passes this pulse via lead 42 to OR circuit 46 and then to output 56 substantially without further delay or modification. Via the said lead 41 it enters the pulse transmitter 53 for the purpose of generating the second pulse of the spaced interrogation pair as already described. Electronic switch 45 is essentially triggered by the pulse on 55 and thereafter promptly switches its output from lead 42 to lead 43, this so that the ATCRBS reply which is generated promptly after the reception of the second pulse of the interrogation pair (from antenna 21) can be received and directed through additional delay 47. Electronic switch 45 is preferably self-timing, so that after a period long enough to pass the longest anticipated ATCRBS reply code (on the order of 20.3 microseconds) it switches its output back to 42 where it remains until after the next interrogation pulse from antenna 20 is received. Accordingly, a further delayed output 44 into the OR circuit 46 insures that the received ATCRBS reply code is re-radiated from antenna 21 in the transponder 11 toward antenna 20 in the interrogator 10 essentially in the same manner as with the interrogation pulse itself.

Each received ATCRBS code into the transponder 10 passes through antenna 20, RF duplexer 19, receiver 49, and into time discriminator 23 as well as into decoder-memory 22. The additional delay 47 discussed in FIG. 4 provides time for the storage of a received ATCRBS coded reply directly from 12 before the retransmitted reply from 11 arrives at interrogator 10. Thus the decoder-memory 22 will have "remembered" a direct ATCRBS reply so that time discriminator 23 can make a time comparison of the entire ATCRBS code received via the transponder 11 against this stored direct code.

It will be realized that any deviation of the aircraft carrying the ATCRBS equipment 12 from the centerline of the runway (or other pathway) 13 will produce a differential arrival time between the direct ATCRBS code and the retransmitted code via transponder 11. Accordingly, the output of time discriminator 23 will be seen to provide a bi-polar error signal which, when digitized by A/D converter 24, can be passed through multiplexer 16 and via cable 15 back to the control tower 14. If the multiplexer 16 is of the time division type, there is obviously sufficient time delay in this centerline error signal generation process to permit the previously identification code to pass from block 17 via lead 48 through multiplexer 16 before the output of A/D converter 24 is ready for transmission.

To summarize the operation of multiplexer 16, it will be seen that the interrogate enable signal on cable 15 passes from left to right through multiplexer 16 and lead 25 into block 17 where the discrete address of this request is recognized at the corresponding interrogator (10 for example) location. Discretely addressed replies, as hereinbefore described may next be passed through multiplexer 16 back to the control tower 14 via cable 15, that signal having passed via lead 48 through multiplexer 16. Finally, the uncoded pathway centerline deviation error signal from 24 may be next received at multiplexer 16 and forwarded by cable 15 in the same manner.

Referring now to FIG. 3, the lead 29 represents the manual or perhaps programmed interrogate function into the coder/decoder 30. It is in 30 that the discrete address code recognizable in the decoder 17 of each interrogator 10 is generated and forwarded by a lead 31 through a multiplexer 34 and hence into the cable 15 on its way to all the interrogators of the system, two such interrogators being represented on FIG. 1 at 10 and 26.

In accordance with the hereinabove description of the signals passed back from interrogator 10 via cable 15 to the control tower 14, lead 32 represents the identification code passing through multiplexer 34 and recognized as to its discrete address in 30 for proper presentation on the ATCRBS display 38. Lead 33 from multiplexer 34 represents the signal path carrying the output of A/D converter 24 in interrogator 10 which is next passed into cable 15 as previously described. That signal is directed by coder/decoder 30 into logic sense block 35 and thence as an analog control signal into an ILS signal generator 36 and out via lead 37 to a transmitter and an independent antenna operating on an ILS frequency otherwise not used at that particular location for the normal ILS function.

The ILS equipment on-board the aircraft 28 and represented on FIG. 2 at block 12 (along with the ATCRBS beacon) recognizes a balance between 90 and 150 cycle modulation on the transmitted carrier from lead 37 on FIG. 3 in essentially the same manner as effected by the localizer ILS beams as a function of position in an ILS landing.

The ILS radio frequency channel is first modulated by subcarriers separately for the glide path and localizer indication. Accordingly, use of the localizer and subcarrier frequency to apply the variable 90 and 150 cycle modulation tones will cause the ILS cross-pointer indicator to present a lateral deviation indication indistinguishable from that which would be received on a normal ILS approach for landing. The pilot can then use this indication for guidance in following the centerline of the pathway in conditions of essentially zero ground visibility. The sensitivity or scale factor of this ILS localizer indication may be controlled in the ILS signal generator 36 in control tower 14 according to FIG. 3. Quite obviously, a greater indication for a relatively small number of feet of error from the pathway centerline is desirable according to the operation of the invention, whereas in the Approach and Landing situation a lesser sensitivity is desirable especially until the aircraft is essentially at the touchdown point of a runway.

Considering now the sense logic block 35, it will be realized that the sense of the deviation signal generated in 36 must be different for an outgoing aircraft as compared to an incoming aircraft. That is, what would be a right of centerline error signal in one case becomes a left indication if the aircraft is proceeding in the opposite direction on the pathway. Sense logic 35 might be as simple as a reversing switch manually operated by a control tower operator. As a variation, additional circuitry might be provided for effecting this sense change automatically. There are several possibilities for automating that sense logic function, one being a separate circuit for recognition which of the two ATCRBS replies (both discretely coded) from 10 and 26 (see FIG. 1) arrives first. The results of such an evaluation could be used to electronically switch block 35 accordingly.

The use of an ILS channel for transmitting the centerline deviation error signal as outlined hereinabove presents no disadvantage to the normal operation of an ILS system. A number of separate radio frequency channels are assigned for ILS operation, and at any one airport it is possible to choose a channel which would be noninterferring with the locally active ILS channels. The guidance signals according to the invention can be transmitted from 37 at sufficiently low power to avoid interference with a normal ILS on that particular channel at some other airport location. Less than normal ILS carrier power is required from block 36 (FIG. 3), since the aircraft on the surface is relatively close to the transmitter as compared to an aircraft on Landing Approach up to 10 miles distant.

To provide some numerical examples of typical airport physical situations, the dimensions indicated on FIG. 1 might be on the order 300 feet for $d_1$, the actual hard surfaced runway or taxiway with $d_4$ being nominally less than 300 feet. In its so-called Mode II operation the ATCRBS equipment responds to a pulse pair spaced 8 microseconds plus or minus 0.2 microseconds. Assuming that the aircraft is precisely on the pathway centerline, $d_2$ and $d_3$ are each 150 feet, that distance corresponds to a radar transit time of 0.150 microseconds. Accordingly, after the first pulse emitted by interrogator 10 reaches the ATCRBS equipment 12 on aircraft 28, an additional 0.150 microseconds will be required for it to traverse the $d_2$ distance to be received at transponder 11. If the delay 52 in transponder 11 is 7.7 microseconds the retransmitted pulse from 11 arrives at the ATCRBS location 12 precisely 8 microseconds after the first pulse. The 0.2 microsecond tolerance in pulse spacing accepted by the ATCRBS equipment will be seen to permit a practical variation in the lateral location of the aircraft with respect to the runway centerline. For commercial aircraft it is conceivable that at least nominal variations can be expected when weather and visibility are poor. It can readily be shown that response of the transponder at another location on the airport surface even if such were to occur, would not result in the generation of a suitably spaced pulse pair.

In general, it is desirable to supply at least nominal directivity at antennas 20 and 21 associated with 10 and 11 respectively; this in addition to the inherently low powered nature of 10 and 11 forms a combination precluding to a very high degree, the generation of spurious ATCRBS interrogations.

Various modifications and amplifications of the structure and functions disclosed and described will suggest to those skilled in this art. For example, in lieu of the arrangement in FIG. 4, a form of signal analyzer might be substituted which examines received signals at the transponder location to determine whether they are single pulses in accordance with the recognition mode or are group of pulses in a coded arrangement such as the ATCRBS reply code. For the retransmission of the reply code, which may be as much as 20.3 microseconds duration, such a signal processor could operate to switch in the additional delay 47 in lieu of the automatic switching contemplated in FIG. 4 in anticipation of the arrival of the ATCRBS reply code.

Other modifications and variations are also possible once the principles of the invention are understood. Accordingly, it is not intended that the drawings or this description should be considered as limiting the scope of the invention, these being intended to be typical and illustrative only.

What is claimed is:

1. A vehicle control system particularly for guidance of ATCRBS and ILS equipped aircraft along predetermined airport surface pathways including runways, taxiways and the like, comprising:

a plurality of ATCRBS interrogating stations spaced along the length of at least one corresponding airport surface pathway along which said aircraft is to be guided, each of said interrogating stations including, an interrogator for generating the first of the RF pulse pair required for interrogation of said ATCRBS equipment on an aircraft on said pathway and laterally adjacent to said interrogator, a transponder responsive to said interrogator and located on the opposite side of said pathway from said interrogator, said transponder having means for generating the second pulse of said pulse pair at a time delay which, when added to the delays inherent in the distances among said interrogator, said transponder and said aircraft, produces said second pulse at a time such that the spacing of the pulses of said pair is correct for interrogation of said ATCRBS equipment;

delay control means within said transponder for increasing the response delay thereof after retransmission of said second pulse of said pulse pair for a time at least sufficient to receive and retransmit a maximum duration reply pulse train from said ATCRBS equipment, lateral error computing means within said interrogator for comparing said ATCRBS replys received directly with those retransmitted by said transponder to develop an error signal representative of the deviation of said aircraft from the centerline of said pathway;

and guidance transmission means for transmitting said error signal to said aircraft through an ILS channel, said error signal thereby being visually presented therein.

2. Apparatus according to claim 1 in which said error computing means comprises a memory for storing said ATCRBS replys received directly and a time discriminator responsive to the code stored in said memory with the ATCRBS code subsequently received by retransmission from said transponder to develop said error signal as a function of the time variation in successive receptions of said retransmitted code.

3. Apparatus according to claim 2 in which said guidance transmission means comprises means for generating ILS localizer modulation as a function of said error signal for transmission over an ILS RF channel to ILS equipment on board said aircraft to provide left/right guidance.

4. Apparatus according to claim 1 in which said guidance transmission means comprises means for generating ILS localizer modulation as a function of said error signal for transmission over an ILS RF channel to ILS equipment on board said aircraft to provide left/right guidance.

5. Apparatus according to claim 4 in which said guidance transmission means is placed at a location remote from said surface pathways and interconnecting cables are provided for transmission of said error signal to said remote location.

6. Apparatus according to claim 1 in which said guidance transmission means is placed at a location remote from said surface pathways and interconnecting cables are provided for transmission of said error signal to said remote location.

* * * * *